United States Patent [19]

Motomura et al.

[11] Patent Number: 5,371,672
[45] Date of Patent: Dec. 6, 1994

[54] SCINTILLATION CAMERA APPARATUS CAPABLE OF QUANTITATIVELY ELIMINATING SCATTERING SIGNAL COMPONENTS BY SETTING MULTIPLE WINDOW AND METHOD FOR QUANTITATIVELY ELIMINATING SCATTERING SIGNAL COMPONENTS

[75] Inventors: Nobutoku Motomura; Takashi Ichihara, both of Tokyo, Japan

[73] Assignee: Kabushiki Kaisha Toshiba, Kawasakishi, Japan

[21] Appl. No.: 841,517

[22] Filed: Feb. 26, 1992

[30] Foreign Application Priority Data

Mar. 27, 1991 [JP] Japan ................................. 3-063443

[51] Int. Cl.$^5$ ............................................ G06F 15/42
[52] U.S. Cl. ............................. 364/413.24; 378/62
[58] Field of Search .......................... 378/5, 901, 62; 364/413, 24

[56] References Cited

U.S. PATENT DOCUMENTS

| | | | |
|---|---|---|---|
| 4,839,808 | 6/1989 | Koral et al. | 364/413.24 |
| 4,899,054 | 2/1990 | Barfod | 250/369 |
| 5,293,195 | 3/1994 | Berlad et al. | 364/413.24 |
| 5,315,506 | 5/1994 | Wang et al. | 364/413.19 |

FOREIGN PATENT DOCUMENTS 1-320491 12/1989 Japan .

OTHER PUBLICATIONS

Ogawa et al, "A Practical Method for Position-Dependent Compton-Scatter Correction in Single Photon Emmission CT" IEEE Trans. on Medical Imaging vol. 10, No. 3, 1991 pp. 408–412.
Spiegel "Schaum's Outline of Probability and Statistics" McGraw-Hill New York, 1975, pp. 85, 258–261.
Patent Abstracts of Japan, vol. 11, No. 62 (P–551) (2509), Feb. 25, 1987, JP-A-61 226 676, Oct. 8, 1986.
Database Inspec, No. 92:4062409.

*Primary Examiner*—Paul M. Dzierzynski
*Assistant Examiner*—David V. Bruce
*Attorney, Agent, or Firm*—Oblon, Spivak, McClelland, Maier & Neustadt

[57] ABSTRACT

In a scintillation camera apparatus, a gamma-ray scattering signal component is removed from gamma-ray spectral energy distribution data. A scattering component removing method first detects an entire radiation emitted from a radioisotope having a specific energy level and injected into a biological body under medical examination to produce an entire radiation detecting signal. Then only first partial radiation from the radioisotope passing through a first energy range determined in relation to the specific energy level of the radioisotope is detected, thereby producing a first count value of the partial radiation. Partial second and third radiation from the radioisotope passing through second and third energy ranges positioned at both ends of the first energy range and also each having a width narrower than that of the first energy range are then detected, thereby producing second and third count values of the second and third partial radiation. These first to third radiation detecting steps are simultaneously performed. An amount of a scattering radiation component contained in the first partial radiation from the radioisotope passing through the first energy range based on both the second and third count values of the second and third partial radiation is then inferred. The amount of the scattering signal component is then subtracted from the first partial radiation passing through the first energy range, whereby the scattering signal component is removed from the entire radiation detecting signal.

38 Claims, 15 Drawing Sheets

F I G. 11
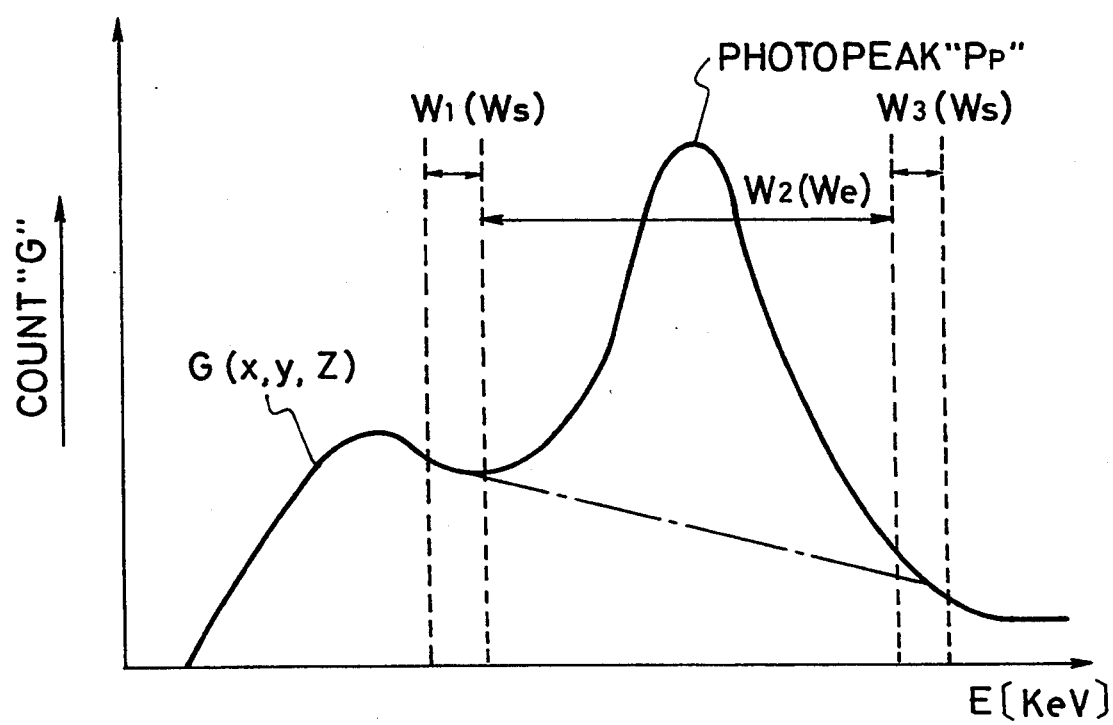

SCINTILLATION CAMERA APPARATUS CAPABLE OF QUANTITATIVELY ELIMINATING SCATTERING SIGNAL COMPONENTS BY SETTING MULTIPLE WINDOW AND METHOD FOR QUANTITATIVELY ELIMINATING SCATTERING SIGNAL COMPONENTS

BACKGROUND OF THE INVENTION

1. Field of the Invention

The present invention generally relates to a scintillation camera apparatus and a method capable of eliminating from a gamma-ray spectral energy distribution signal, a scattering signal component of gamma rays emitted from a radioisotope such as $^{99m}$Tc (technetium) which has been injected into a biological body under medical examination. More specifically, the present invention is directed to such a method and a gamma camera apparatus that the gamma-ray scattering signal components caused by a scattering phenomenon occurring within the biological body and also the gamma camera apparatus can be quantitatively removed from the gamma-ray distribution signal by way of a multiple window setting method.

2. Description of the Prior Art

In nuclear medical diagnostic systems, a radioisotope is injected into a biological body under medical examination, and a distribution of the injected radioisotope is imaged by a gamma camera for a medical diagnostic purpose. To improve diagnosing capabilities by such nuclear medical diagnostic systems, γ(gamma)-ray scattering signal components must be effectively removed from the two-dimensional image data indicative of the γ-ray energy distribution within the biological body imaged by the gamma camera. These γ-ray scattering signal components are mainly caused by the gamma-ray scattering phenomenon occurring within the biological body and also within the gamma camera (for instance, an internal portion of a collimator and an NaI scintillator).

Conventionally, the following two methods have been proposed in order to eliminate the above-explained γ-ray scattering components from the two-dimensional image data (indicative the γ-ray energy distribution) acquired by the gamma camera.

In accordance with the first γ-ray scattering component removing method, as represented in FIG. 1, one main window "Wm" is set around a photopeak of a γ-ray energy spectrum curve and also another subwindow "Ws" having a width similar to that of the main window "Wm" is set on a lower energy-level portion of this γ-ray energy spectrum curve with respect to the energy level of the photopeak.

Assuming now that γ-ray image data acquired from an energy region defined by the main window "Wm" is M(x, y) (symbols "x" and "y" indicate two-dimensional coordinate system), and γ-ray image data acquired from an every region defined by the subwindow "Ws" is S(x, y), desirable γ-ray image data C(x, y) from which the scattering signal components have been removed may be calculated from the below-mentioned equation (1).

$$C(x, y) = M(x, y) - R \times S(x, y) \quad (1)$$

where symbol "R" indicates a preselected constant.

The above-described first conventional scattering-component removing method is known from, for instance, "Improved SPECT Quantification Using Compensation for Scattered Photons" written by Ronald J. Jaszczak et al., BASIC SCIENCES, The Journal of Nuclear Medicine, volume 25, No. 8, pages 893–900, 1984.

Also, in accordance with the second conventional scattering component removing method, as indicated in FIG. 2, "N" (N is greater than 1) pieces of γ-ray image data acquired by utilizing a window "$W_{EN}$". This window "$W_{EN}$" owns a narrow width "ΔE" capable of sufficiently reproducing a γ-ray spectral energy distribution curve. As a result, a shape of this γ-ray spectral energy distribution curve can be grasped, scattering signal components are inferred from this distribution curve shade, and then the inferred scattering signal components are removed from the image data on the photopeak, whereby desirable γ-ray image data can be obtained.

The second conventional γ-ray scattering-component removing method is known from, for example, "SPECT Compton-Scattering Correction by Analysis of Energy Spectra" written by Kenneth F. Koral et al, BASIC SCIENCES, The Journal of Nuclear Medicine, volume 29, No. 2, pages 195–202, 1988.

However, the first conventional γ-ray scattering-component removing method has the following drawbacks. That is, although the γ-ray image data in the energy range defined by the main window "Wm" and containing the photopeak is wanted to be correctly acquired, this energy range contains the γ-ray scattering signal components. Nevertheless, actual γ-ray scattering-components contained in other energy range as defined by the subwindow "Ws" are measured. Then, based on this actually-measured scattering components, the first-mentioned scattering components contained in the desirable γ-ray image data with the photopeak are inferred. As a consequence, the first-mentioned scattering components are not correctly or actually measured, and thus the desirable γ-ray image data from which the actual scattering components have been eliminated cannot be obtained.

In accordance with the second conventional γ-ray scattering-component removing method, precision of the scattering-component elimination may be improved as compared with the first conventional removing method. However, since a large quantity of image data must be acquired by utilizing the window having such a very narrower width "ΔE" than that of the main or subwindow "Wm", "Ws", a lengthy time period is necessarily required so as to entirely acquire such γ-ray image data. Moreover, when other γ-ray scattering components of a specific radioisotope having more than two photopeaks are measured, plenty of time is required to acquire entire image data, resulting in practical difficulties. In other words, real-time γ-ray imaging operation can be hardly realized.

SUMMARY OF THE INVENTION

The present invention has been made in an attempt to solve the above-described problems, and therefore has an object to provide a method and an apparatus capable of removing gamma-ray components from gamma-ray image data within a very short time period and at high precision.

Another object of the present invention is to provide a scintillation camera apparatus capable of eliminating the gamma-ray components from the gamma-ray image data in units of pixels of this image.

Another object of the present invention is to provide a scintillation camera apparatus capable of simply calculating the scattering signal component elimination.

A further object of the preset invention is to provide a scintillation camera apparatus capable of effectively solving the crosstalk problem that occurs when a radioisotope having multiple photopeaks is employed.

A still further object of the present invention is to provide a scintillation camera apparatus capable of realizing quantative SPECT (single photon emission computed tomographic) imaging.

To achieve the above-described objects and other features occurring in the present invention, a method used for a scintillation camera apparatus (100:200:400), comprises the steps of:

detecting entire radiation emitted from a radioisotope having a specific energy level and injected into a biological body under medical examination to produce an entire radiation detecting signal;

detecting only first partial radiation from the radioisotope passing through a first energy range (W1:We) determined in relation to the specific energy level of the radioisotope, thereby producing a first count value of the partial radiation;

detecting partial second and third radiation from the radioisotope passing through second and third energy ranges (W2:W3:Ws) positioned at both ends of the first energy range (W1:We) and also each having a width narrower than that of the first energy range (W1:We), thereby producing second and third count values of the second and third partial radiation, said first to third radiation detecting steps being simultaneously performed;

inferring an amount of a scattering radiation component (As(x, y)) contained in the first partial radiation from the radioisotope passing through the first energy range (W1:We) based on both the second and third count values of the second and third partial radiation; and, subtracting the amount of the scattering signal component (As(x, y)) from the first partial radiation passing through the first energy range (W1:We), whereby the scattering signal component is removed from the entire radiation detecting signal.

Further, according to the present invention, a method used for a scintillation camera apparatus (300) comprises the steps of:

detecting entire radiation emitted from a radioisotope having a single photopeak (Pp) with a specific energy level and injected into a biological body under medical examination to produce an entire radiation detecting signal;

detecting only first partial radiation from the radioisotope passing through a first energy range (Wt) determined in relation to the specific energy level of the single photopeak (Pp), thereby producing a first count value of the partial radiation;

detecting only second partial radiation from the radioisotope passing through a second energy range (W1) having a narrower width than that of the first energy range (Wt) and positioned adjoining to the first energy range (Wt), thereby producing a second count value of the partial radiation;

inferring an amount of a scattering radiation component (As(x, y)) contained in the first partial radiation of the radioisotope based upon the first and second count values; and, subtracting the amount of the scattering radiation component (As(x, y)) from the first partial radiation, whereby the scattering radiation component is removed from the entire radiation detecting signal.

Also, according to the present invention, a method used for a scintillation camera apparatus (100:200:400), comprises the steps of:

detecting entire radiation emitted from a radioisotope having a specific energy level and injected into a biological body under medical examination to produce an entire radiation detecting signal containing a positional component (x, y) and an energy component (z) of the entire radiation;

detecting only first partial radiation from the radioisotope passing through a first energy range (W1:We) determined in relation to the specific energy level of the radioisotope, thereby producing a first partial radiation detecting signal;

detecting second and third partial radiation from the radioisotope passing through second and third energy ranges (W2:W5:Ws) positioned at both ends of the first energy range (W1:We) and also each having a width narrower than that of the first energy range (W1:We), thereby producing second and third partial radiation detecting signals, said first to third partial radiation detecting steps being simultaneously performed;

forming a first partial-radiation distribution image (Ct(x, y)) from the first partial radiation detecting signal;

forming second and third partial-radiation distribution images (Ch(x, y):Ce(x, y)) from the second and third partial radiation detecting signals;

inferring a scattering radiation component image (As(x, y)) based upon the second and third partial-radiation distribution images (Ch(x, y):Ce(x, y)); and, correcting the first partial-radiation distribution image (Ct(x, y)) by removing the scattering radiation component image (As(x, y)) therefrom, whereby the entire radiation detecting signal free from the scattering radiation component is obtained.

Then, according to the present invention, a method used for a scintillation camera apparatus (300), comprises the steps of:

detecting entire radiation emitted from a radioisotope having a single photopeak (Pp) with a specific energy level and injected into a biological body under medical examination to produce an entire radiation detecting signal containing a positional component and an energy component of the entire radiation;

detecting only first partial radiation from the radioisotope passing through a first energy range (Wt) determined in relation to the specific energy level of the single photopeak "Pp", thereby producing a first partial radiation detecting signal;

detecting only second partial radiation from the radioisotope passing through a second energy range (W1) having a narrower width than that of the first energy range (Wt) and positioned adjoining to the first energy range (Wt), thereby producing a second partial radiation detecting signal;

forming a first partial-radiation distribution image (Ct(x, y)) from the first partial radiation detecting signal;

forming a second partial-radiation distribution image (Ch(x, y)) from the second radiation detecting signal;

inferring a scattering radiation component image (As(x, y)) based upon the first and second partial-radiation distribution images (Ct(x, y):Ch(x, y)); and, correcting the first partial-radiation distribution image (Ct(x, y)) by removing the scattering radiation component image (As(x, y)) therefrom, whereby the entire radiation detecting signal free from the scattering radiation component is obtained.

In accordance with the present invention, a scintillation camera apparatus (100:200:400) comprises:

means (10:12) for detecting entire radiation emitted from a radioisotope having a specific energy level and injected into a biological body under medical examination to produce an entire radiation detecting signal containing a positional component (x, y) and an energy component (z) of the entire radiation;

means (42:43:442) for setting a first energy-level window (W1:We) determined in relation to the specific energy level of the radioisotope to the entire radiation so as to detect first partial radiation from the radioisotope passing through the first energy-level window (W1:We) as a first partial-radiation detecting signal; and for setting second and third energy-level windows (W2:W3:Ws) each having a width narrower than that of the first energy-level window (W1:We) so as to detect second and third partial radiation from the radioisotope passing through the second and third energy-level windows (W2:W3:Ws) as second and third partial-radiation detecting signals;

means (26) for forming a first partial-radiation distribution image (Ct(x, y)) from the first partial-radiation detecting signal, a second partial-radiation distribution image (Ch(x, y)) from the second partial-radiation detecting signal, and a third partial-radiation distribution image (Ce(x, y)) from the third partial-radiation detecting signal;

means (46:46) for inferring a scattering radiation component image (As(x, y)) based upon the second and third partial-radiation distribution images (Ch(x, y):Ce(x, y)); and, means (48) for correcting the first partial-radiation distribution image (Ct(x, y)) by removing the scattering radiation component image (As(x, y)) therefrom, whereby the entire radiation detecting signal free from the scattering radiation component is obtained.

Finally, a scintillation camera apparatus (300) according to the present invention, comprises:

means (10:12) for detecting entire radiation emitted from a radioisotope having a single photopeak (Pp) with a specific energy level and injected into a biological body under medical examination to produce an entire radiation detecting signal;

means (46) for setting a first energy-level window (Wt) determined in relation to the specific energy level of the radioisotope to the entire radiation In order to detect first partial radiation from the radioisotope passing through the first energy-level window (Wt) as a first partial-radiation detecting signal; and for setting a second energy-level window (W1) having a width narrower than that of the first energy-level window (Wt) so as to detect second partial radiation from the radioisotope passing through the second energy-level window (W1) as a second partial-radiation detecting signal;

means (26) for forming a first partial-radiation distribution image (Ct(x, y)) from the first partial-radiation detecting signal, and a second partial-radiation distribution image (Ch(x, y)) from the second partial-radiation detecting signal;

means (46) for inferring a scattering radiation component image (As(x, y)) based on the first and second partial-radiation distribution images (Ct(x, y):Ch(x, y));and, means (48) for correcting the first partial-radiation distribution image (Ct(x, y)) by removing the scattering radiation component image (As(x, y) therefrom, whereby the entire radiation detecting signal free from the scattering radiation component is obtained.

BRIEF DESCRIPTION OF THE DRAWINGS

For a better understanding of the present invention, reference is made of the following description in conjunction with the accompanying drawings in which:

FIG. 11 is a graphic representation for showing a modification of the second scattering component removing method with employment of three windows;

DETAILED DESCRIPTION OF THE PREFERRED EMBODIMENTS

BASIC IDEA

Figure 1:
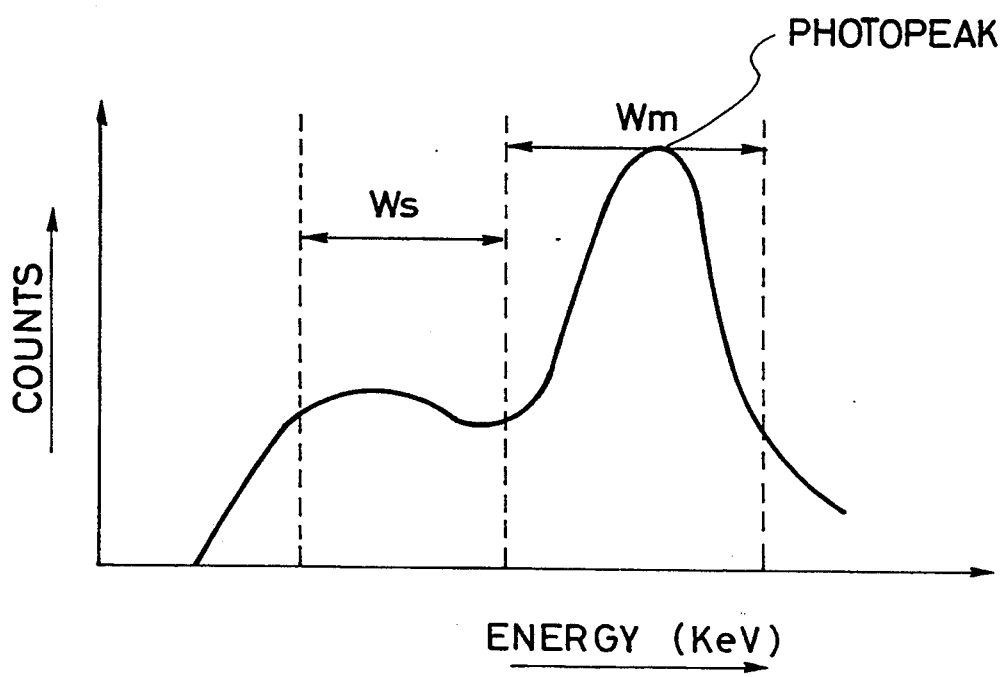
FIGS. 1 and 2 are schematic illustrations for representing two conventional methods to eliminate scattering signal components from gamma-ray image data.
Figure 2:
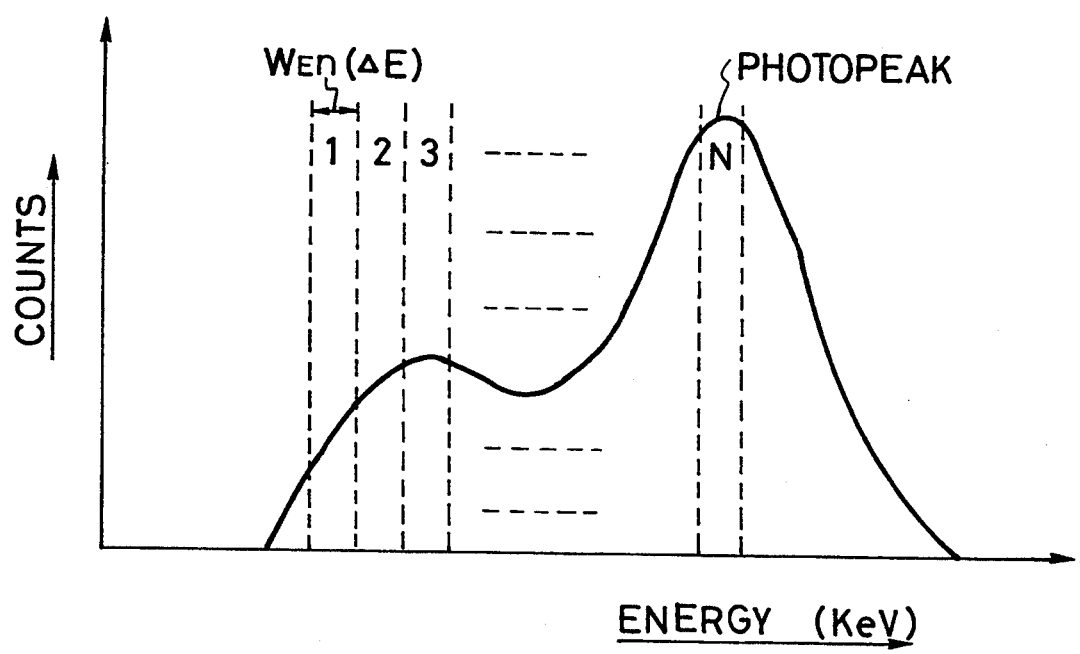
Figure 3:
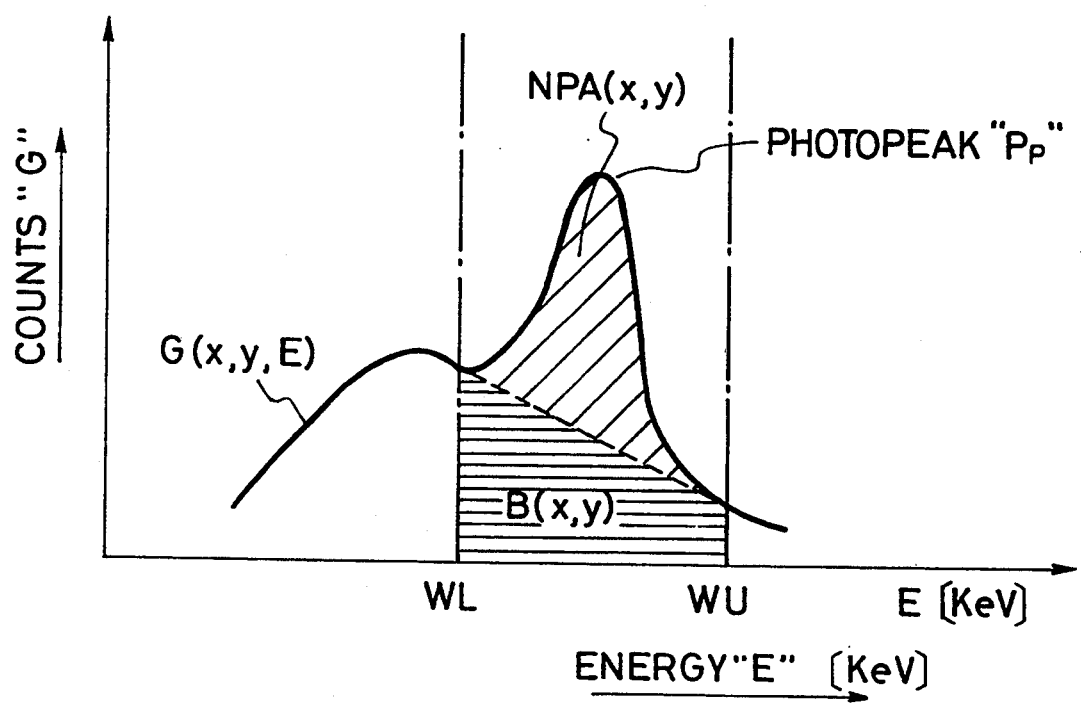
FIG. 3 illustrates how to infer a scattering signal component in accordance with the present invention based upon a Monte Carlo investigation.

The present invention has been made based upon the following recognition and idea:

FIG. 3 represents a typical spatial energy distribution curve of gamma-ray image data. Within a spatial energy distribution curve (region) defined by an upper value "WU" and a lower value "WL" with respect to a photopeak "Pp", symbol B(x, y) indicates an area of γ-ray scattering signal components and symbol NPA(x, y) denotes an area of the photopeak "Pp" from which the scattering signal components have been removed, namely this area NPA(x, y) corresponds to a desirable or true γ-ray spectrum region. If this scattering component area could be precisely calculated, or inferred, correctness of the desirable γ-ray image data (spectral distribution characteristic) could be achieved. To establish such a precise calculation of the scattering signal components, the Monte Carlo's probability inferring method has been utilized in the present invention.

A description will now be made of the precise calculation of the scattering signal components based on the Monte Carlo inferring method with reference to FIG. 3.

In FIG. 3, an ordinate indicates counts of photons emitted from a RI (radioisotope) injected into a biological body under medical examination, whereas an abscissa denotes energy "E" [keV]. The γ-ray spectral energy distribution depends upon incident positions (x, y) of the γ-ray. Assuming now that when two windows are set at an upper limit value "WU" of this spectral energy distribution curve and a lower limit value "WL" thereof with respect to the photopeak "Pp", the entire γ-ray energy spectrum is expressed by G(x, y, E); an area defined by all data within these windows "WL", "WU" is indicated by P(x, y); an area of only the photopeak "Pp" from which γ-ray scattering signal components have been removed is denoted by NPA(x, y), namely a desirable γ-ray image data area; and an area of the γ-ray scattering signal components is indicated by B(x, y), the following relationship as defined by two equations (2) and (3) can be satisfied by way of the Monte Carlo's probability inferring method:

$$P(x, y) = \int_{wL}^{wU} G(x, y, E) \, dE \quad (2)$$

$$NPA(x, y) = \int_{wL}^{wU} G(x, y, E) \, dE - B(x, y) \quad (3)$$

As apparent from the graphic representation of FIG. 3, since the area of the γ-ray scattering signal components B(x, y) may be analogized as a trapezoid, this trapezoid area B(x, y) can be obtained by the following equation (4), namely a calculation to obtain a trapezoid area:

$$B(x, y) = \{G(x, y, WU) + G(x, y, WL)\} \times (WU - WL)/2 \quad (4)$$

From the above equations, the desirable area "NPA(x, y)" constructed of only the photopeak "Pp" can be correctly calculated in such a manner that the all area P(x, y) is subtracted by the actual γ-ray scattering signal components As(x, y).

In other words, the elimination calculation for the γ-ray scattering signal components according to the present invention can be correctly proved based on the Monte Carlo's inferring method.

ARRANGEMENTS OF FIRST SCATTERING COMPONENTS REMOVING APPARATUS

Figure 4:
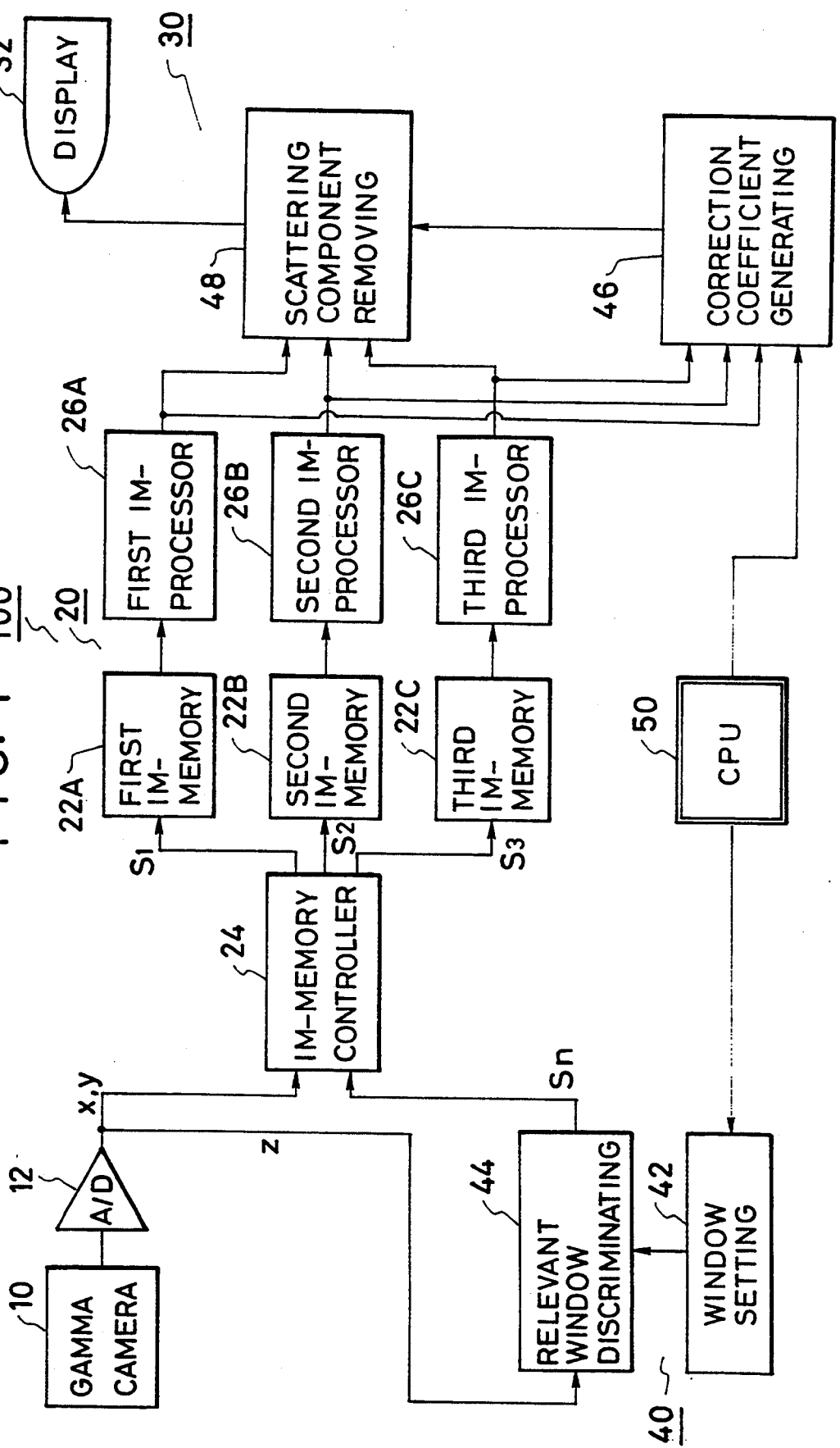
FIG. 4 is a schematic block diagram for showing an arrangement of a scintillation camera apparatus 100 according to a first preferred embodiment of the present invention.

FIG. 4 is a schematic block diagram for showing an overall arrangement of a scintillation camera apparatus 100, according to a first preferred embodiment of the present invention, capable of removing scattering signal components from entire γ-ray image data, which is achieved based on the above-described basic idea of the present invention.

The first scintillation camera apparatus 100 is mainly constructed of a gamma camera body 10, an image data memory unit 20, a gamma-ray image display unit 30, and a scattering component removing unit 40. The scattering component removing unit 40 includes a window setting circuit 42, a relevant window discriminating circuit 44, a correction coefficient producing circuit 46, and a scattering component removing circuit 48 (will be described in more detail). This scattering component removing unit 40 constitutes a major featured circuit of the first scintillation camera apparatus 100.

In this first scintillation camera apparatus 100, since three windows are set to a γ-ray spectral energy distribution, the image data memory unit 20 employs three image data memories 22A, 22B and 22C. A central processing unit (CPU) 50 mainly controls the window setting circuit 42 and the correction coefficient generating circuit 46.

FIRST SCATTERING COMPONENT REMOVING OPERATION

Figure 5:
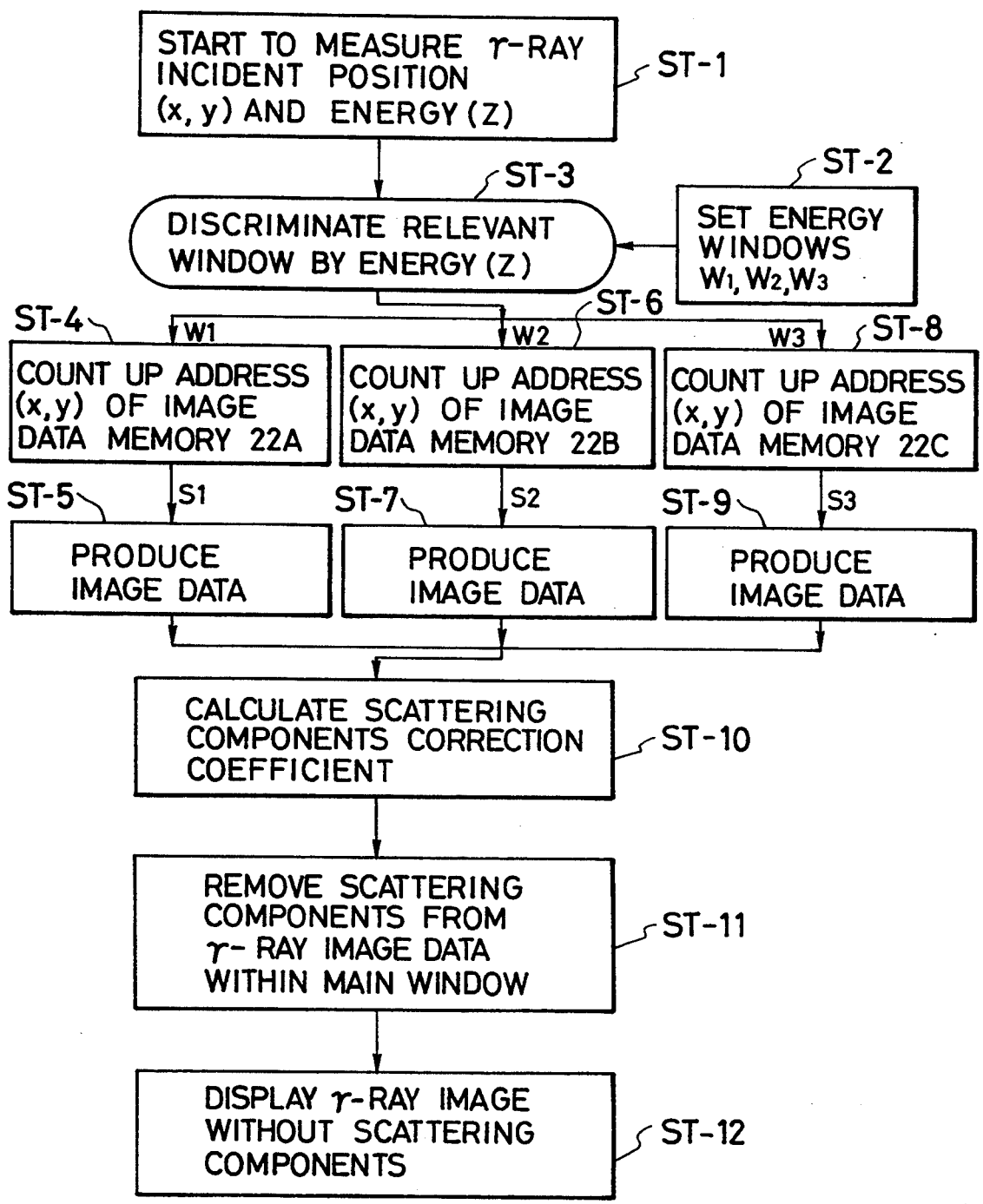
FIG. 5 is a flow chart for explaining a scattering component removing method of the first scintillation camera apparatus 100 shown in FIG. 4.

Referring now to a flow chart shown in FIG. 5, a γ-ray scattering component removing method performed by the first scintillation camera apparatus 100 will be described.

At a first step ST-1 of the flow chart, a measurement is commenced to obtain both a γ-ray energy signal "Z" and a γ-ray incident position signal (x, y) from the gamma camera body 10 via an A/D converter 12 as a digital signal form. The digital γ-ray incident position signal (x, y) is supplied to an image memory controller 24, whereas the digital γ-ray incident position signal (Z) is supplied to the relevant window discriminating circuit 44. As previously described, three windows (i.e., a main window "W1" and two subwindows "W2, W3") are settable in this relevant window discriminating circuit 44 by the window setting circuit 42 under control of the CPU 50 at a step ST-2.

At the next step ST-3, the relevant window discriminating operation is carried out in response to the γ-ray energy signal (Z) derived from the gamma camera body 10 via the A/D converter 12. If the present energy signal (Z) supplied to the relevant window discriminating circuit 44 corresponds to, or belongs to the main window "W1", a first window discriminating signal "S1" is produced from this relevant window discriminating circuit 44, so that an address (x, y) of the first image data memory 22A is counted up under control of the image data controller 24 at a step ST-4.

In addition, since the γ-ray incident position signal (x, y) has been determined to be written into the first image memory 22A by discriminating the level of the above-described γ-ray energy signal (Z) in the window discriminating circuit 44, this γ-ray incident position signal (x, y) is written into the first image data memory 22A. Thereafter, this digital γ-ray incident position signal (x, y) is read out from the first image data memory 22A and is then supplied to a first image data processing circuit 26A in order to obtain a two-dimensional image indicative of a γ-ray spectral distribution in this main window "W1" within the biological body (not shown in detail) under medical examination (step ST-5).

On the other hand, if the present energy signal (Z) supplied to the relevant window discriminating circuit 44 corresponds to the first subwindow "W2", a second window discriminating signal "S2" is produced from this relevant window discriminating circuit 44. As a result, an address (x, y) of the second image data memory 22B is counted up under control of the image data controller 24 at a step ST-6. Also, this γ-ray incident position signal (x, y) is written into the second image data memory 22B. Subsequently, the digital γ-ray incident position signal (x, y) is read out from the second image data memory 22B and is then supplied to a second image data processing circuit 26B so as to obtain another two-dimensional image representative of a γ-ray spectral distribution within the first subwindow "W2" at a step ST-7.

Similarly, if the present energy signal (Z) supplied to the relevant window discriminating circuit 44 belongs to the second subwindow "W3", a third window discriminating signal "S3" is produced from this relevant window discriminating circuit 44. As a consequence, an address (x, y) of the third image data memory 22C is counted up under control of the image memory controller 24 at a step ST-8. Thereafter, another two-dimensional image indicative of a γ-ray spectral distribution within the second subwindow "W3" is produced by processing the digital γ-ray incident position signal (x, y) read out from the third image data memory 26C at a step ST-9.

At the subsequent step ST-10, the above-described γ-ray scattering components' area B(x, y) as shown in FIG. 3 is calculated in the correction coefficient generating circuit 46. As a consequence, the desirable area NPA(x, y) constructed of only the photopeak "Pp" can be calculated by subtracting this correction coefficient (i.e., scattering signal components) in the scattering component removing circuit 48 at a step ST-11 (will be described more in detail).

In other words, the γ-ray scattering signal components within the main window W1 are calculated as the correction coefficient at the step ST-10. Subsequently, the γ-ray scattering signal components are removed from a portion of the γ-ray image data G(x, y) within the main window W1, whereby desirable γ-ray spectral energy distribution image data without containing the scattering signal components can be obtained at the step ST-11.

Finally, a desirable γ-ray spectral energy distribution image with the photopeak "Pp" can be displayed on the display unit 32 at a step ST-12.

PICTORIAL EXPLANATION OF FIRST SCATTERING COMPONENT REMOVING METHOD

Figure 6:
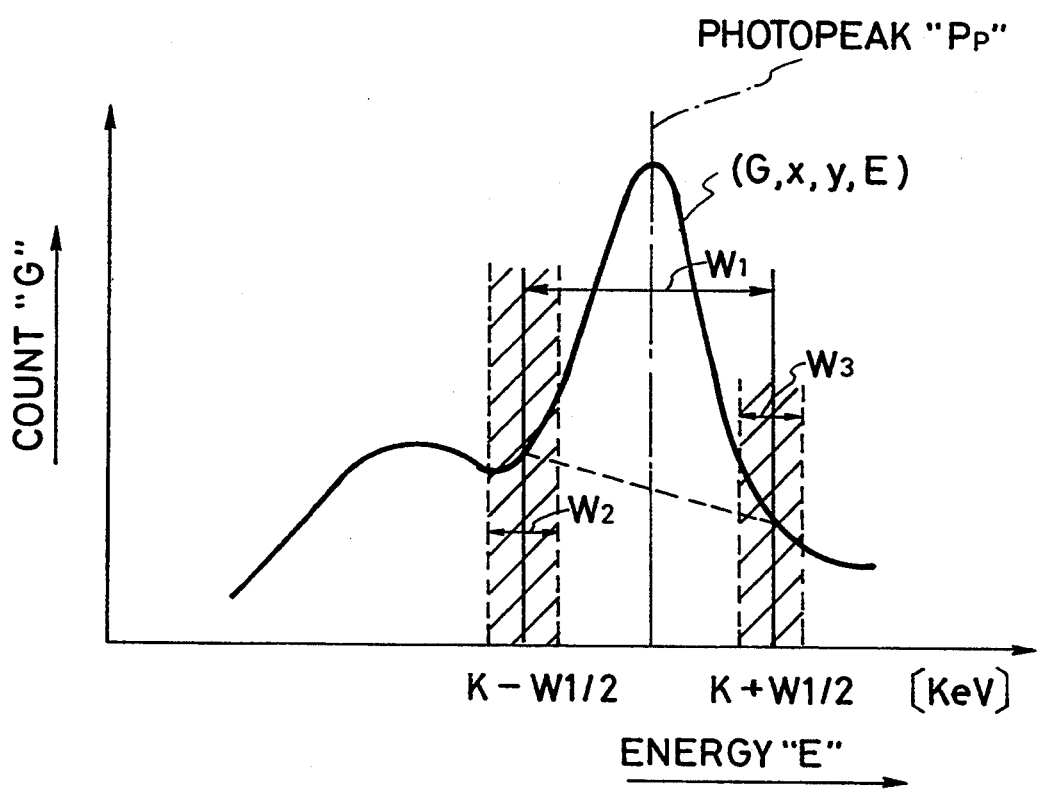
FIG. 6 is a graphic representation for showing how to perform the first scattering component removing method of the first scintillation camera apparatus 100.
Figure 7:
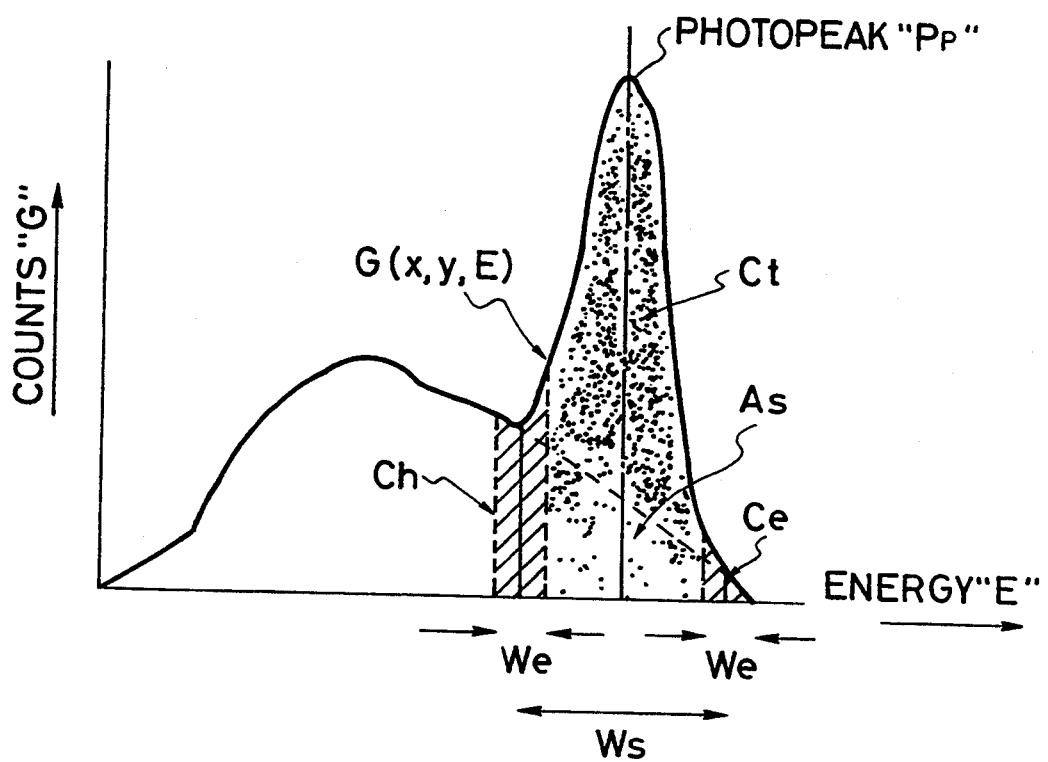
FIG. 7 is a graphic representation for representing the scattering component removing calculation executed in the first scintillation camera apparatus 100.

FIGS. 6 and 7 pictorially explain the above-described scattering component removing method according to the first preferred embodiment of the present invention, which is realized in the first scintillation camera apparatus 100 shown in FIG. 4.

As represented in FIG. 6, the main window "W1" having such an energy region width of $(k+W\frac{1}{2})$ and $(k-W\frac{1}{2})$ is set to the entire γ-ray energy spectrum G(x, y) with respect to the photopeak "Pp" as a center, and also the first and second subwindows "W2" and "W3" are set to both ends of this main window "W1" under overlap conditions. It should be noted that the energy region width of the main window "W1" may be determined by considering the energy resolution of the gamma camera body 10. The optimum energy region width of the main window "W1" may be selected by utilizing the Monte Carlo inferring method. For instance, this energy region width may be selected to be 20 to 26% of the energy of the photopeak "Pp", whereas the energy region widths of the first and second subwindows "W2" and "W3" may be selected to be 2 to 6 keV, respectively.

As previously described with reference to the flow chart shown in FIG. 5, based upon the γ-ray image data (i.e., respective areas) acquired at the respective windows W1, W2, W3, image data Ct(x, y), Ch(x, y) and Ce(x, y) are calculated in accordance with the following equations (5), (6) and (7).

$$Ct(x, y) = \int_{k-w1/2}^{k+w1/2} G(x, y, E) \, dE \quad (5)$$

$$Ch(x, y) = \int_{k-w1/2 \, - \, w2/2}^{k=w1/2+w2/2} G(x, y, E) \, dE \quad (6)$$

$$Ce(x, y) = \int_{k+w1/2-w2/2}^{k+w1/2+w2/2} G(x, y, E) \, dE \quad (7)$$

To pictorially grasp the first gamma-ray component removing method carried out by the first scintillation camera apparatus 100 of FIG. 4, these areas Ct(x, y), Ch(x, y) and Ce(x, y) are illustrated in FIG. 7.

As apparent from FIG. 7, the γ-ray scattering signal components (corresponding to the trapezoid area B(x, y) of FIG. 3) can be inferred. That is, a trapezoid area As(x, y) indicative of the γ-ray scattering signal components with regard to the overall area data P(x, y) (corresponding to the area "Ct(x, y)") within the main window "W1" can be obtained by the following equation (8).

$$As(x, y) = (Ch + Ce)W_1/(2W_2) \quad (8)$$

Referring back to the arrangement of the first scintillation camera apparatus 100 shown in FIG. 4, this trapezoid area As(x, y) is produced as the correction coefficient from the correction coefficient generating circuit 46. Thereafter, this scattering signal components As(x, y) is subtracted from the entire area Ct(x, y) defined within the main window W1 in the γ-ray scattering component removing circuit 48. That is to say, the γ-ray scattering components are eliminated from the photopeak image (namely, two-dimensional image Ct(x, y) indicative of the gamma-ray component distribution within the biological body defined by the main window "W1") in this scattering component removing circuit 48. As a consequence, a gamma-ray two-dimensional image free from the scattering signal components can be displayed on the display unit 32.

ARRANGEMENT OF SECOND SCATTERING COMPONENT REMOVING SYSTEM

Figure 8:
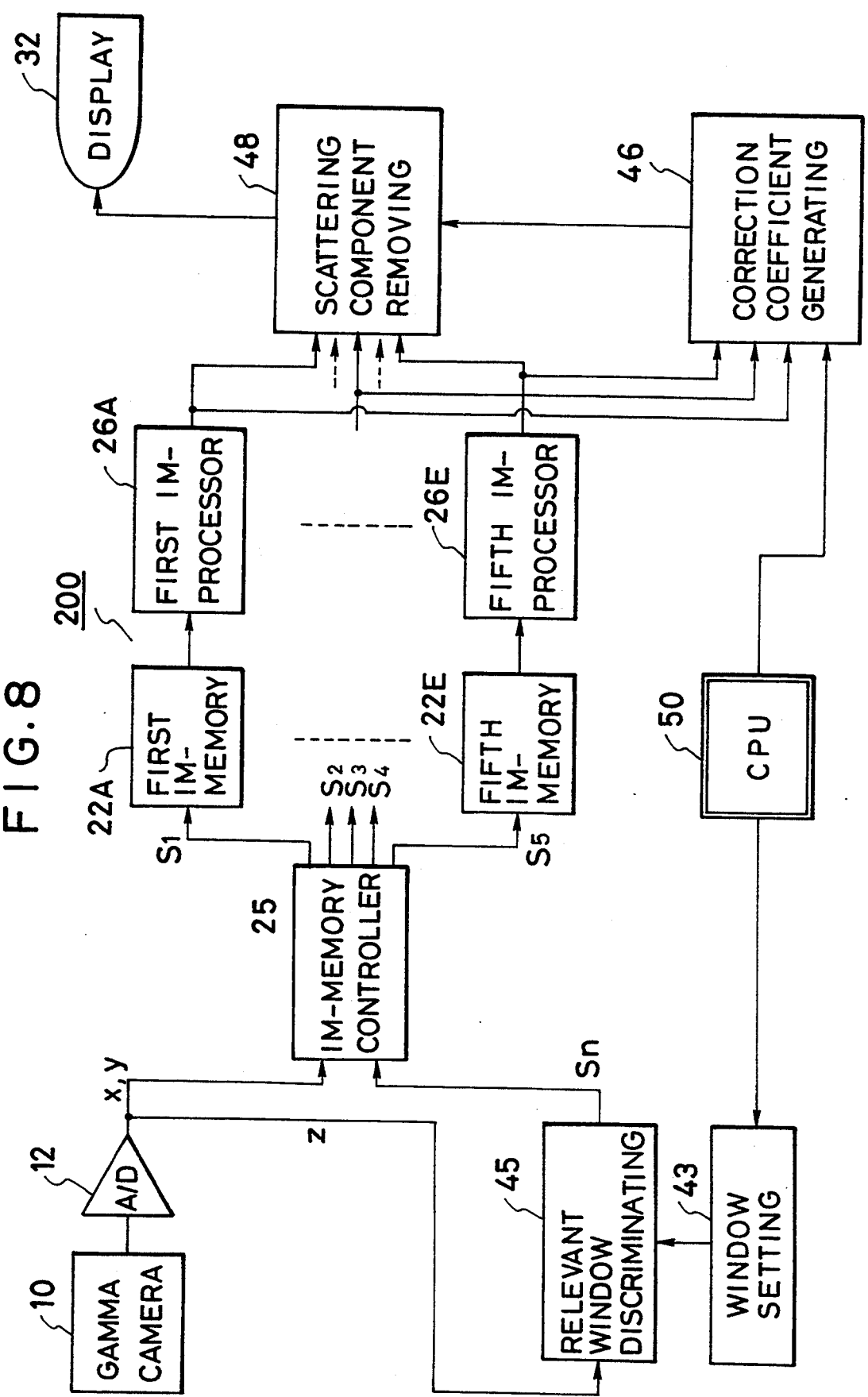
FIG. 8 is a schematic block diagram for showing an arrangement of a scintillation camera apparatus 200 according to a second preferred embodiment of the present invention.

FIG. 8 Is a schematic block diagram for showing an arrangement of a scintillation camera apparatus 200 according to a second preferred embodiment of the present invention, in which a second scattering component removing method is carried out.

It should be noted that the same reference numerals shown in FIG. 4 will be employed as those for denoting the same or similar circuit blocks shown in the following figures.

As easily seen from the arrangements shown in FIGS. 4 and 8, the second scintillation camera apparatus 200 newly employs a window setting circuit 43 capable of setting five windows; a relevant window discriminating circuit 45 capable of discriminating one relevant window from four remaining windows; first to fifth image data memories 22A to 22E; an image memory controller 25; and first to fifth image processing circuits 26A to 26E.

Figure 9:
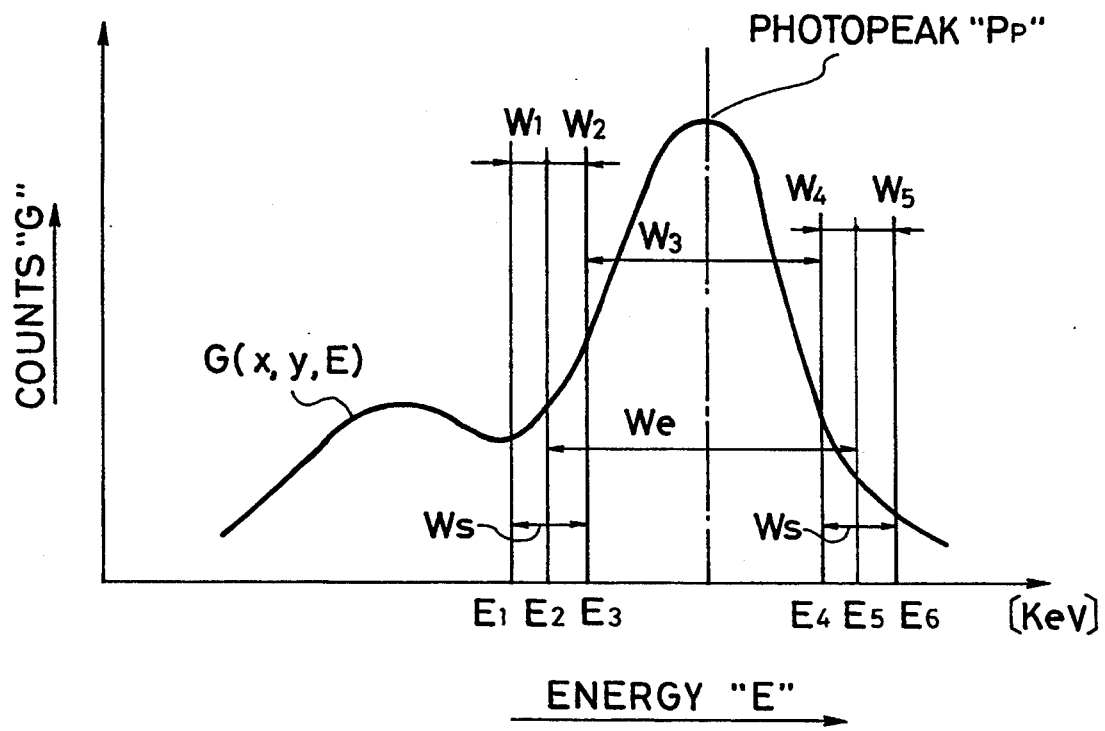
FIG. 9 is a graphic representation for showing how to perform the second scattering component removing method by the second scintillation camera apparatus 200.

FIG. 9 represents 5 windows and a gamma-ray energy spectrum according to the second gamma-ray component removing method.

As shown in FIG. 9, five energy windows "W1" to "W5" (which are not equal to the first to third windows "W1" to "W3" shown in FIG. 6) are set to the entire gamma-ray spectral energy distribution G(x, y, z). In this second preferred embodiment, the window "W3" has an energy width of 24% of the energy width of the photopeak "Pp", whereas each of the remaining windows has an energy width of 4 KeV.

An overall operation from the window setting operation to the scattering component removing operation, according to the second preferred embodiment, will now be described with reference to a flow chart shown in FIG. 10.

Figure 10:
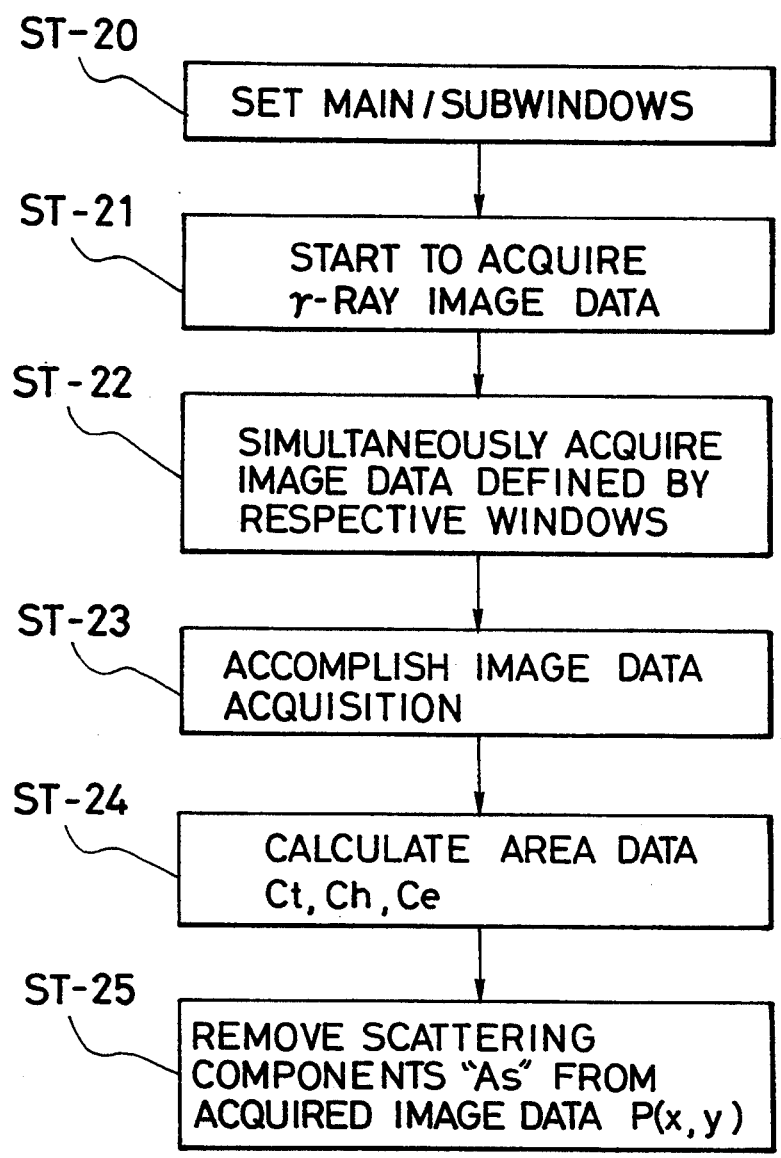
FIG. 10 is a flow chart for explaining a flow operation of the second scattering component removing method.

In the flow chart of FIG. 10, a main window "We" and subwindows "Ws" are set on the γ-ray spectral energy distribution G(x, y, z) by utilizing the above-described five windows "W1" to "W5" at a step ST-20. Then, γ-ray image data are acquired under such window setting conditions at a step ST-21, so that γ-ray image data P1(x, y), P2(x, y), P3(x, y), P4(x, y) and P5(x, y) are acquired at the same time (step ST-22).

After this image data acquisition has been completed at a step ST-23, the desirable image data areas Ct(x, y), Ch(x, y) and Ce(x, y) are calculated by utilizing these acquired image data P1(x, y) to P5(x, y) in accordance with the following equations (9), (10) and (11) at a step ST-24. It should be noted that a filtering process may be performed with respect to these image data P1 to P5 by way of a proper filtering means (not shown) instead of the above-explained calculation.

$$Ct(x, y) = P2(x, y) + P3(x, y) + P4(x, y) \quad (9)$$

$$Ch(x, y) = P4(x, y) + P5(x, y) \quad (10)$$

$$Ce(x, y) = P1(x, y) + P2(x, y) \quad (11)$$

Furthermore, widths of the main window "We" and each subwindow "Ws" are calculated by utilizing the respective energy values "E1" to "E6" based on the below-mentioned equations (12) and (13):

$$Ws = E3 - E1 = E6 - E4 \quad (12)$$

$$We = E5 - E2 \quad (13)$$

In accordance with another equation (14), the scattering component area (namely, a trapezoid area) As(x, y) corresponding to the scattering component correction efficient is calculated by utilizing the above-described values:

$$As(x, y) = (Ch + Ce)Ws/(2We) \quad (14)$$

At a final step ST-25, the resultant scattering component area As(x, y) is supplied from the correction coefficient generating circuit 46 to the scattering component removing circuit 48 so that the entire γ-ray image area Ct(x, y) is subtracted by this scattering component area As(x, y). As a result, the desirable γ-ray image data free from the scattering signal components can be obtained from the scattering component removing circuit 48.

MODIFICATION OF SECOND SCATTERING COMPONENT REMOVING METHOD

In the previous scattering component removing method as shown in FIG. 9, five windows "W1" to "W5" have been set to the γ-ray spectral energy distribution G(x, y, z). Alternatively, it is possible to set only three windows "W1", "W2", "W3" in such a manner that these two subwindows "W1" and "W3" are not overlapped with the main window "W2" (note that a portion of one subwindow "Ws" is overlapped with the main window "We" in FIG. 9).

Similarly, each of image data areas Ct(x, y), Ch(x, y) and Ce(x, y) is calculated as follows:

$$Ct(x, y) = P2(x, y) \quad (15)$$

$$Ch(x, y) = P1(x, y) \quad (16)$$

$$Ce(x, y) = P3(x, y) \quad (17)$$

where symbols P1(x, y), P2(x, y) and P3(x, y) represent image data acquired within the respective windows "W1", "W2" and "W3".

Then, a relationship between widths of these windows W1, W2, W3 and those of the main window We and of the subwindows Ws is given as follows:

$$Ws(\text{width of subwindow}) = W1 = W3 \quad (18)$$

$$We(\text{width of main window}) = W2 \quad (19)$$

As a consequence, the scattering component area As(x, y) can be similarly calculated by employing the above-described values in accordance with the above-described equation (14), whereby the γ-ray image data free from the scattering signal components can be obtained.

THIRD SCATTERING COMPONENT REMOVING SYSTEM

Figure 12:
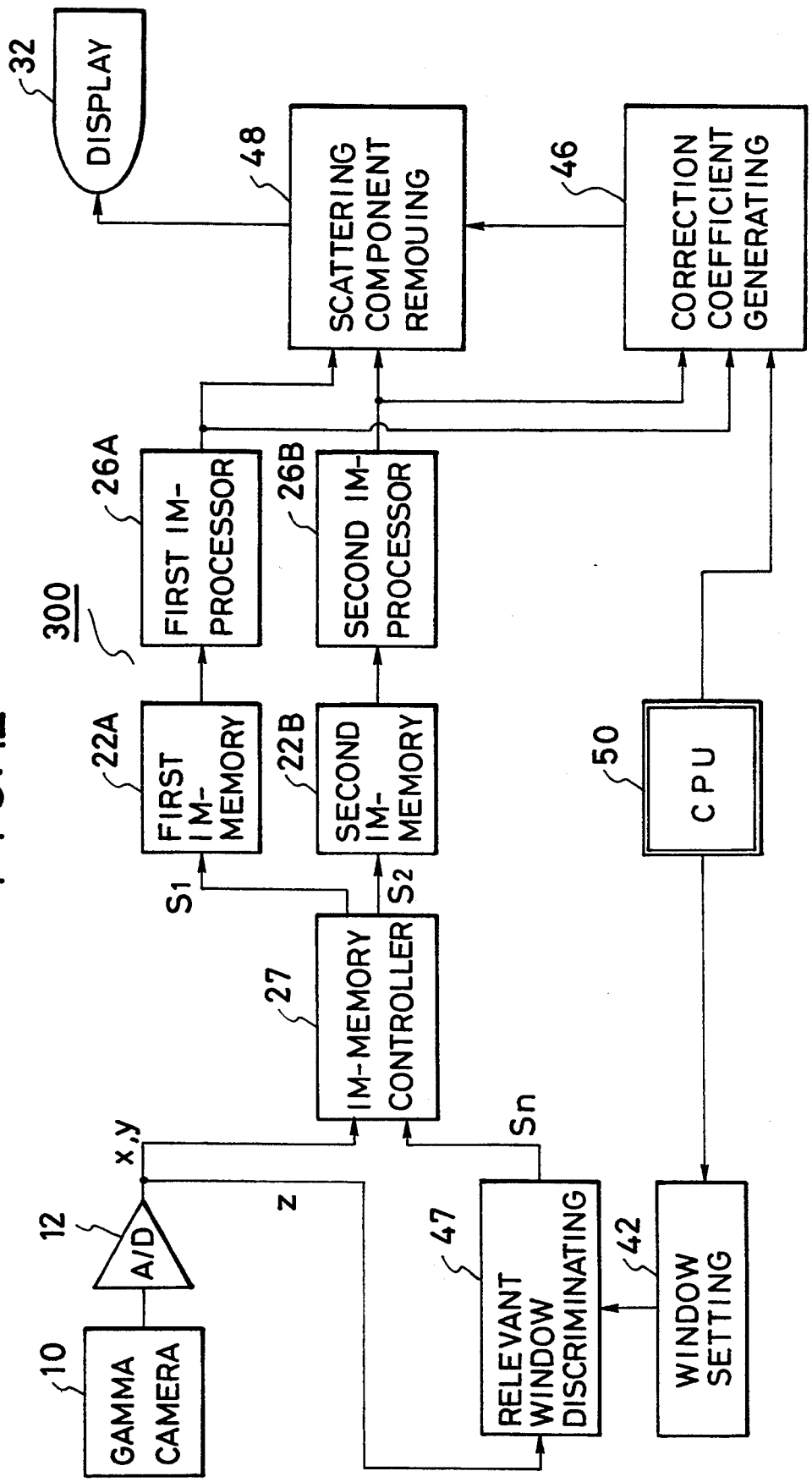
FIG. 12 is a schematic block diagram for representing an arrangement of a scintillation camera apparatus 300 according to a third preferred embodiment of the present invention.

FIG. 12 is a schematic block diagram for showing an arrangement of a scintillation camera apparatus 300 according to a third preferred embodiment of the present invention, in which a third scattering component removing method is performed.

Figure 13:
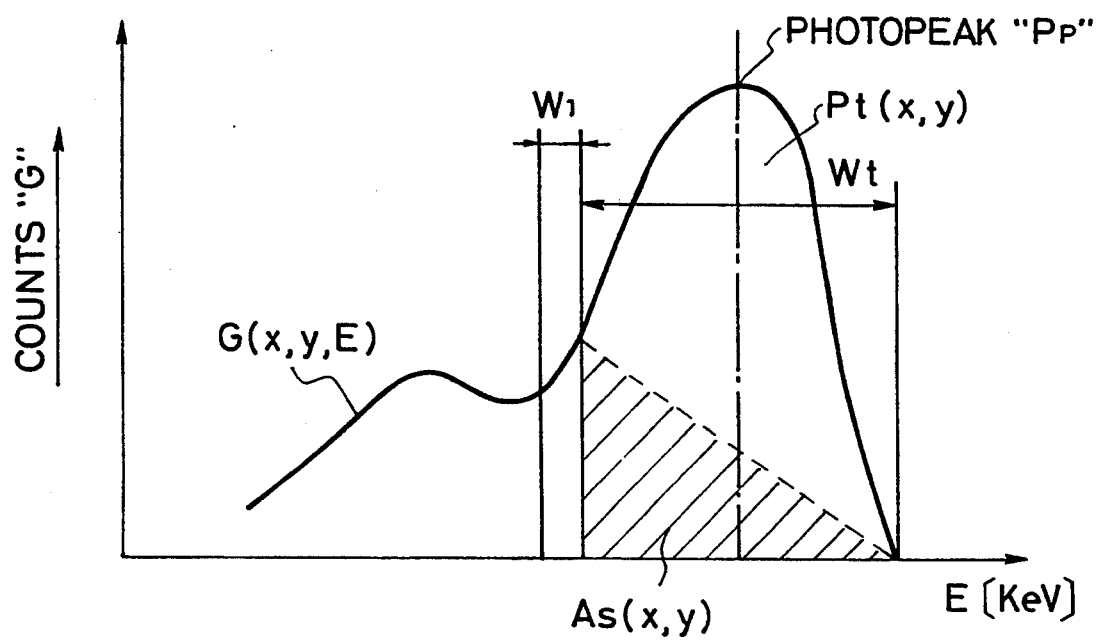
FIG. 13 is a graphic representation for showing how to perform the third scattering component removing method by the third scintillation camera apparatus 300.

The feature of this third scattering component removing method is to simplify measurements of a two-dimensional image indicative of a gamma-ray distribution with employment of only two windows, as illustrated in FIG. 13.

In case of such a radioisotope having a single photopeak as $^{98m}$Tc (technetium), since it may be supposed that substantially no γ-ray scattering component appears at a higher energy portion of an entire spectral energy distribution G(x, y, z), the energy values of the scattering components defined by the windows "W4" and "W5" shown in FIG. 9 may be analogeous to zero. Furthermore, since the widths of the windows W2 and W4 positioned on both sides of the photopeak "Pp" are very narrow, these windows may be analogized by a single window W1, or W5.

Accordingly, in this third scattering component removing method, image data "Ct" and "Cl" are acquired by setting only one main window Wt having 24%-width of the photopeak "Pp" and one subwindow W1 having 4 keV-width so that the desirable scattering component removing operation can be achieved. Precisely speaking, the respective image data areas Ct(x, y), Ch(x, y) and Ce(x, y) are calculated by the following approximate equations (20), (21) and (22):

$$Ct(x, y) = Ct(x, y) \quad (20)$$

$$Ch(x, y) = 0 \quad (21)$$

$$Ce(x, y) = Cl(x, y) \quad (22)$$

Based on these values, a triangle-shaped scattering component area As(x, y) may be calculated by the following equation (23):

$$As(x, y) = (Ch + Ce)Ws/(2We) \quad (23)$$

where symbol "Ws" indicates a window width of the main window "Wt" and symbol "We" represents a window width of the subwindow "W1".

As a result, the image data Ct acquired within the main window Wt is subtracted by this triangle-shape scattering component area As(x, y) so as to obtain the γ-ray image data free from the scattering signal components.

FOURTH SCATTERING COMPONENT REMOVING SYSTEM

Figure 14:
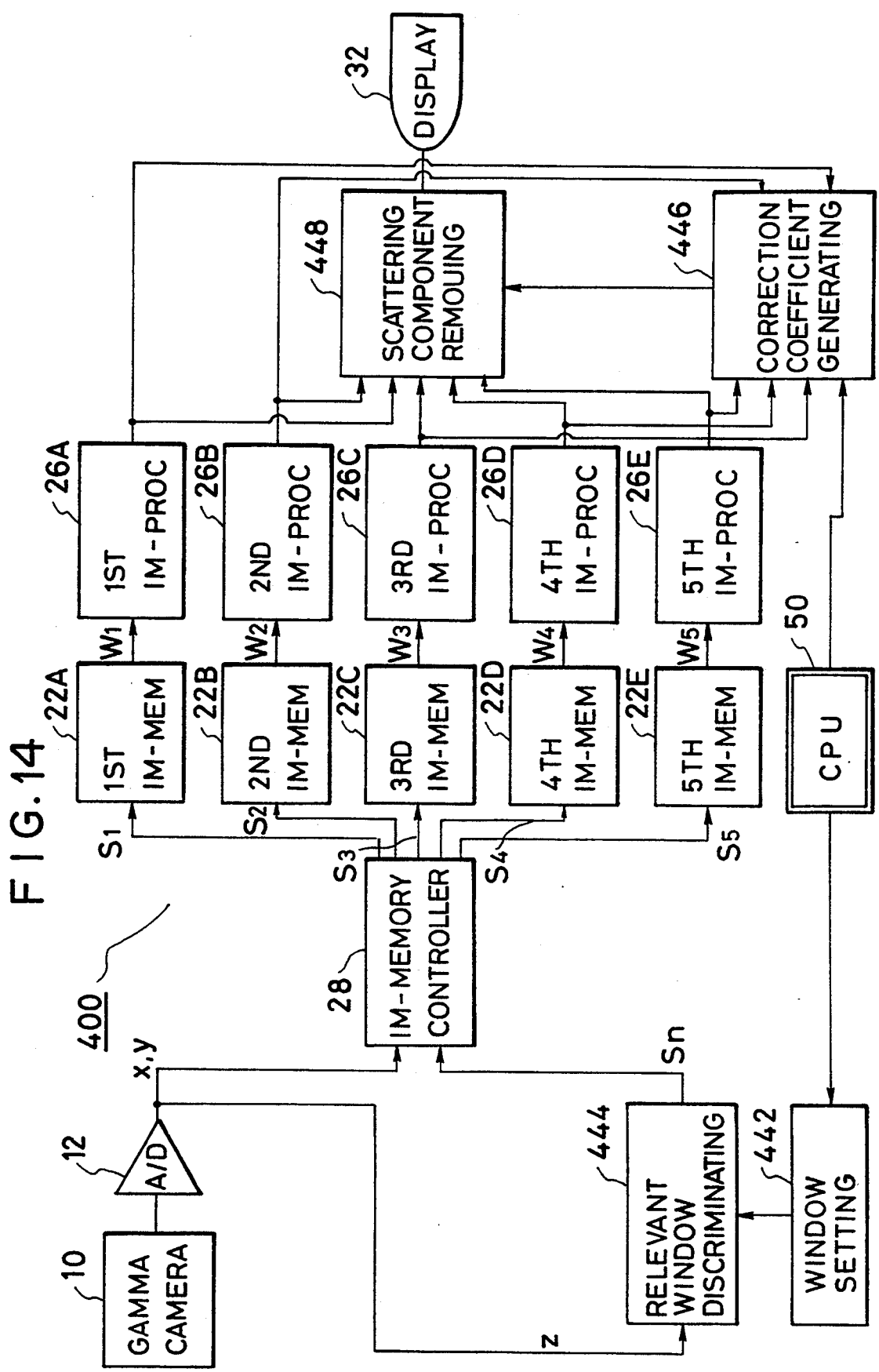
FIG. 14 is a schematic block diagram for indicating an arrangement of another scintillation camera apparatus 400 according to a fourth preferred embodiment of the present invention; and, FIG. 15 is a graphic representation for showing how to perform the fourth scattering component removing method by the fourth scintillation camera apparatus 400.
Figure 15:
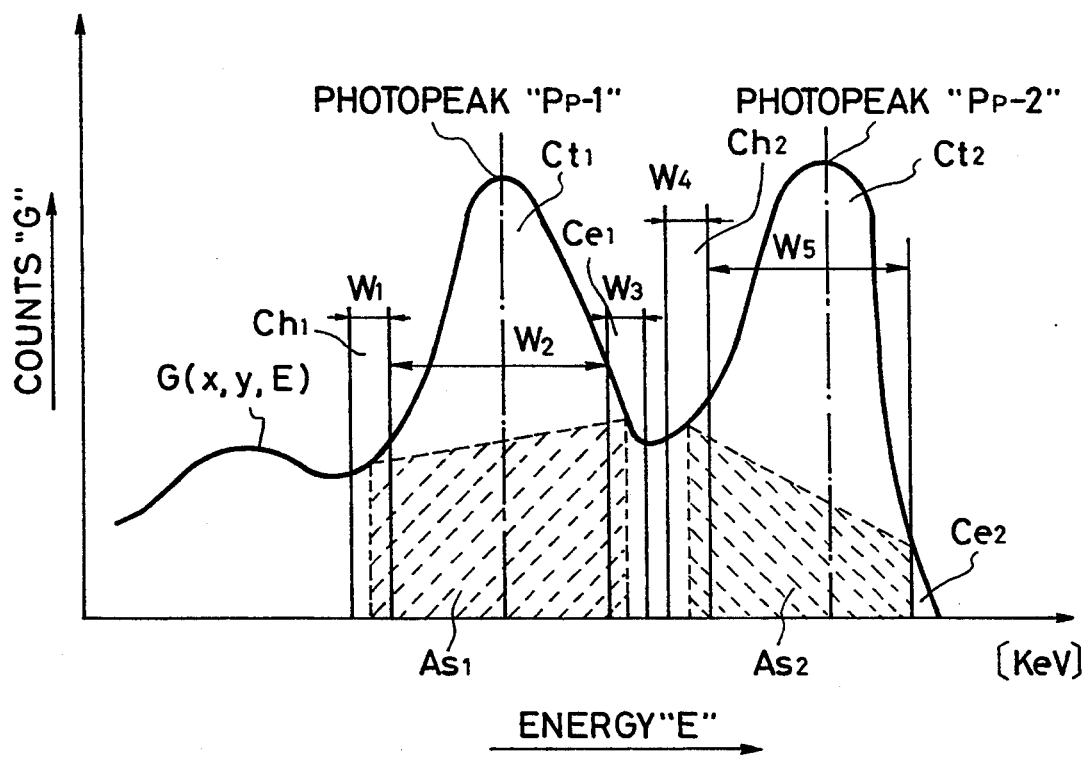

There are some possibilities to simultaneously employ a plurality of RIs (radioisotopes) having different energy peaks (photopeaks) from each other in the nuclear medical examination. As a fourth scattering component removing method of the present invention, two different sorts of RIs are utilized in an arrangement of a fourth scintillation camera apparatus 400 shown in FIG. 14. FIG. 15 illustrates how to set windows to a gamma-ray spectral energy distribution G(x, y, z) having two photopeaks "Pp-1" and "Pp-2". As represented from FIG. 15, since there are a large amount of scattering signal components As1(x, y) at a high energy side of the first photopeak "Pp-1" due to the presence of the second photopeak "Pp-2" at this higher energy side, three windows W1, W2 and W3 are required for defining the first photopeak "Pp-1". To the contrary, since there is a small amount of scattering signal components at another higher energy side of the second photopeak "Pp-2", only two windows W4 and W5 are sufficient to calculate the scattering signal component area As2(x, y). In the fourth scintillation camera apparatus 400, five image data "C1" to "C5" for the respective windows "W1" to "W5" are simultaneously acquired in accordance with a manner similar to those of the first to third embodiments.

As a result, the respective first image data areas Ct1(x, y), Ch1(x, y), Ce1(x, y) and As1(x, y) may be calculated with respect to the first photopeak "Pp-1" as follows:

$$Ct1(x, y) = C2(x, y) \quad (24)$$

$$Ch1(x, y) = C1(x, y) \quad (25)$$

$$Ce1(x, y) = C3(x, y) \quad (26)$$

$$As1(x, y) = (Ch1 + Ce1)Ws/(2We) \quad (27)$$

Then, the respective second image data areas Ct2(x, y), Ch2(x, y), Ce2(x, y) and As2(x, y) may be calculated with respect to the second photopeak "Pp-2" as follows:

$$Ct2(x, y) = C5(x, y) \quad (28)$$

$$Ch2(x, y) = C4(x, y) \quad (29)$$

$$Ce2(x, y) = 0 \quad (30)$$

$$As2(x, y) = (Ch2 + Ce2)Ws/(2We) \quad (31)$$

As a result of these calculations, two scattering component areas As1(x, y) and As2(x, y) are obtained. Based upon these scattering component areas As1(x, y) and As2(x, y), the γ-ray scattering signal components can be removed from the γ-ray image data "C2" and "C5" in the fourth scintillation camera apparatus 400.

As apparent from the forgoing description, the scattering component removing method of the present invention may be applied to such image data acquisition in case of multiple radioisotopes.

Furthermore, the scattering component removing methods/apparatuses according to the present invention may be applied to an ECT (emission computed tomography) system. As a consequence, since scattering signal components contained in the respective projection data can be eliminated therefrom, ECT images with high image quality (high resolution) may be obtained.

In the above-described preferred embodiments, both the gamma-ray energy signal (z) and the gamma-ray incident position signal (x, y) are acquired so as to perform the scattering component removing methods. Alternatively, only the gamma-ray energy signal (z) may be acquired in order to execute the scattering component receiving method according to the present invention.

While the present invention has been described in detail, a plurality of windows are set with respect to a single photopeak and image data within the plural windows are acquired so as to remove the scattering signal components from the γ-ray energy spectrum defined within these windows. Accordingly, a total time duration required for this scattering component elimination can be considerably shortened, as compared with that of the conventional scattering component removing methods. Moreover, since the γ-ray scattering signal components with respect to this photopeak can be precisely inferred and eliminated from the relevant γ-ray image data, higher resolution of gamma-ray image can be achieved, and also the quantative scattering component removing methods can be realized.

What is claimed is:

1. A method used for a scintillation camera apparatus, comprising the steps of:

detecting entire radiation emitted from a radioisotope having a specific energy level and injected into a biological body under medical examination to produce an entire radiation detecting signal;

detecting only first partial radiation from the radioisotope passing through a first energy range determined in relation to the specific energy level of the radioisotope, thereby producing a first count value of the partial radiation;

detecting partial second and third radiation from the radioisotope passing through second and third energy ranges positioned at both ends of the first energy range and also each having a width narrower than that of the first energy range, thereby producing second and third count values of the second and third partial radiation, said first to third radiation detecting steps being simultaneously performed;

inferring an amount of a scattering radiation component contained in the first partial radiation from the radioisotope passing through the first energy range based on both the second and third count values of the second and third partial radiation; and, subtracting the amount of the scattering radiation component from the first partial radiation passing through the first energy range, whereby the scattering radiation component is removed from the entire radiation detecting signal.

2. A method used for a scintillation camera apparatus as claimed in claim 1, wherein said radiation emitted from the radioisotope is a gamma ray.

3. A method used for a scintillation camera apparatus as claimed in claim 1, wherein said specific energy level of the radioisotope is a photopeak.

4. A method used for a scintillation camera apparatus as claimed in claim 3, wherein said first energy range is selected to be approximately 20 to 26% of an energy level of said photopeak, and each of said second and third energy ranges is selected to be approximately 2 to 6 keV.

5. A method used for a scintillation camera apparatus as claimed in claim 1, wherein a shape of said scattering radiation component is analogized as a trapezoid.

6. A method used for a scintillation camera apparatus as claimed in claim 1, wherein said second and third energy ranges are overlapped with the first energy range.

7. A method used for a scintillation camera apparatus as claimed in claim 1, further comprising the steps of:
detecting fourth and fifth partial radiation from the radioisotope passing through fourth and fifth energy ranges positioned adjoining to said second and third energy ranges, thereby producing fourth and fifth count values of the fourth and fifth partial radiation, whereby said scattering radiation component amount is inferred based upon said second to fifth count values of the second to fifth partial radiation.

8. A method used for a scintillation camera apparatus as claimed in claim 1, wherein the specific energy level of the radioisotope is constructed of a first photopeak and a second photopeak, and also fourth and fifth partial radiation from the radioisotope passing through fourth and fifth energy ranges separately positioned from said second and third energy ranges, are detected to obtain fourth and fifth count values of the radiation, whereby said scattering radiation component amount is inferred based upon said second to fifth count values of the partial radiation.

9. A method used for a scintillation camera apparatus, comprising the steps of:
detecting entire radiation emitted from a radioisotope having a single photopeak with a specific energy level and injected into a biological body under medical examination to produce an entire radiation detecting signal;

detecting only first partial radiation from the radioisotope passing through a first energy range determined in relation to the specific energy level of the single photopeak, thereby producing a first count value of the partial radiation;

detecting only second partial radiation from the radioisotope passing through a second energy range having a narrower width than that of the first energy range and positioned adjoining to the first energy range, thereby producing a second count value of the partial radiation;

inferring an amount of a scattering radiation component contained in the first partial radiation of the radioisotope based upon the first and second count values; and, subtracting the amount of the scattering radiation component from the first partial radiation, whereby the scattering radiation component is removed from the entire radiation detecting signal.

10. A method used for a scintillation camera apparatus as claimed in claim 9, wherein said radiation emitted from the radioisotope is a gamma ray.

11. A method used for a scintillation camera apparatus as claimed in claim 9, wherein said first energy range is selected to be approximately 20 to 26% of said specific energy level of said single photopeak, and said second energy range is selected to be approximately 2 to 6 keV.

12. A method used for a scintillation camera apparatus as claimed in claim 9, wherein a shape of said scattering radiation component is analogized as a triangle.

13. A method used for a scintillation camera apparatus, comprising the steps of:
detecting entire radiation emitted from a radioisotope having a specific energy level and injected into a biological body under medical examination to produce an entire radiation detecting signal containing a positional component and an energy component of the entire radiation;

detecting only first partial radiation from the radioisotope passing through a first energy range determined in relation to the specific energy level of the radioisotope, thereby producing a first partial radiation detecting signal;

detecting second and third partial radiation from the radioisotope passing through second and third energy ranges positioned at both ends of the first energy range and also each having a width narrower than that of the first energy range, thereby producing second and third partial radiation detecting signals, said first to third partial radiation detecting steps being simultaneously performed;

forming a first partial-radiation distribution image from the first partial radiation detecting signal;

forming second and third partial-radiation distribution images from the second and third partial radiation detecting signals;

inferring a scattering radiation component image based upon the second and third partial-radiation distribution images; and, correcting the first partial-radiation distribution image by removing the scattering radiation component image therefrom, whereby the entire radiation detecting signal free from the scattering radiation component is obtained.

14. A method used for a scintillation camera apparatus as claimed in claim 13, wherein said radiation emitted from the radioisotope is a gamma ray.

15. A method used for a scintillation camera apparatus as claimed in claim 13, wherein said specific energy level of the radioisotope is a photopeak.

16. A method used for a scintillation camera apparatus as claimed in claim 15, wherein said first energy range is selected to be approximately 20 to 26% of an energy level of said photopeak, and each of said second and third energy ranges is selected to be approximately 2 to 6 keV.

17. A method used for a scintillation camera apparatus as claimed in claim 13, wherein a shape of said scattering radiation component is analogized as a trapezoid.

18. A method used for a scintillation camera apparatus as claimed in claim 13, wherein said second and third energy ranges are overlapped with the first energy range.

19. A method used for a scintillation camera apparatus as claimed in claim 13, further comprising the steps of:

detecting fourth and fifth partial radiation from the radioisotope passing through fourth and fifth energy ranges positioned adjoining to said second and third energy ranges, thereby producing fourth and fifth partial radiation detecting signals, whereby said scattering radiation component amount is inferred based upon said second to fifth partial radiation.

20. A method used for a scintillation camera apparatus as claimed in claim 13, wherein the specific energy level of the radioisotope is constructed of a first photopeak and a second photopeak, and also fourth and fifth partial radiation from the radioisotope passing through fourth and fifth energy ranges separately positioned from said second and third energy ranges, are detected to obtain fourth and fifth partial radiation detecting signals, whereby said scattering radiation component amount is inferred based upon said second to fifth partial radiation detecting signals.

21. A method used for a scintillation camera apparatus, comprising the steps of:

detecting entire radiation emitted from a radioisotope having a single photopeak with a specific energy level and injected into a biological body under medical examination to produce an entire radiation detecting signal containing a positional component and an energy component of the entire radiation;

detecting only first partial radiation from the radioisotope passing through a first energy range determined in relation to the specific energy level of the single photopeak "Pp", thereby producing a first partial radiation detecting signal;

detecting only second partial radiation from the radioisotope passing through a second energy range having a narrower width than that of the first energy range and positioned adjoining to the first energy range, thereby producing a second partial radiation detecting signal;

forming a first partial-radiation distribution image from the first partial radiation detecting signal;

forming a second partial-radiation distribution image from the second radiation detecting signal;

inferring a scattering radiation component image based upon the first and second partial-radiation distribution images; and, correcting the first partial-radiation distribution image by removing the scattering radiation component image therefrom, whereby the entire radiation detecting signal free from the scattering radiation component is obtained.

22. A method used for a scintillation camera apparatus as claimed in claim 21, wherein said radiation emitted from the radioisotope is a gamma ray.

23. A method used for a scintillation camera apparatus as claimed in claim 21, wherein said first energy range is selected to be approximately 20 to 26% of said specific energy range and said second energy range is selected to be approximately 2 to 6 keV.

24. A method used for a scintillation camera apparatus as claimed in claim 21, wherein a shape of said scattering radiation component is analogized as a triangle.

25. A scintillation camera apparatus comprising:

means for detecting entire radiation emitted from a radioisotope having a specific energy level and injected into a biological body under medical examination to produce an entire radiation detecting signal containing a positional component and an energy component of the entire radiation;

means for setting a first energy-level window determined in relation to the specific energy level of the radioisotope to the entire radiation so as to detect first partial radiation from the radioisotope passing through the first energy-level window as a first partial-radiation detecting signal; and for setting second and third energy-level windows each having a width narrower than that of the first energy-level window so as to detect second and third partial radiation from the radioisotope passing through the second and third energy-level windows as second and third partial-radiation detecting signals;

means for forming a first partial-radiation distribution image from the first partial-radiation detecting signal, a second partial-radiation distribution image from the second partial-radiation detecting signal, and a third partial-radiation distribution image from the third partial-radiation detecting signal;

means for inferring a scattering radiation component image based upon the second and third partial-radiation distribution images; and, means for correcting the first partial-radiation distribution image by removing the scattering radiation component image therefrom, whereby the entire radiation detecting signal free from the scattering radiation component is obtained.

26. A scintillation camera apparatus as claimed in claim 25, wherein said radiation emitted from the radioisotope is a gamma ray.

27. A scintillation camera apparatus as claimed in claim 25, wherein said specific energy level of the radioisotope is a photopeak.

28. A scintillation camera apparatus as claimed in claim 27, wherein said first energy-level window is selected to be approximately 20 to 26% of an energy level of said photopeak, and each of said second and third energy-level windows is selected to be approximately 2 to 6 keV.

29. A scintillation camera apparatus as claimed in claim 25, wherein a shape of said scattering radiation component is analogized as a trapezoid.

30. A scintillation camera apparatus as claimed in claim 25, wherein said second and third energy-level windows are overlapped with the first energy-level window.

31. A scintillation camera apparatus as claimed in claim 25, wherein window setting means further sets fourth and fifth energy-level windows positioned adjoining to said second and third energy-level windows in order to detect fourth and fifth partial radiation from the radioisotope passing through the fourth and fifth energy-level windows as fourth and fifth partial-radiation detecting signals, whereby said scattering radiation component image is inferred based upon said second to fifth partial-radiation detecting signals.

32. A scintillation camera apparatus as claimed in claim 25, wherein the specific energy level of the radioisotope is arrange by a first photopeak and a second photopeak, and also said window setting means further sets fourth and fifth energy-level windows separately positioned from said second and third energy-level windows so as to detect fourth and fifth partial-radiation detecting signals, whereby said scattering radiation component image is inferred based on said second to fifth partial-radiation detecting signals.

33. A scintillation camera apparatus as claimed in claim 25, wherein at least first to third memory units are employed; and said window setting means further includes a relevant window discriminating circuit for checking an energy component of one of said first to third partial-radiation detecting signals so as to determine that said first to third partial-radiation distribution images are to be stored in said first to third memory units.

34. A scintillation camera apparatus comprising:
    means for detecting entire radiation emitted from a radioisotope having a single photopeak with a specific energy level and injected to a biological body under medical examination to produce an entire radiation detecting signal;
    means for setting a first energy-level window determined in relation to the specific energy level of the radioisotope to the entire radiation in order to detect first partial radiation from the radioisotope passing through the first energy-level window as a first partial-radiation detecting signal; and for setting a second energy-level window having a width narrower than that of the first energy-level window so as to detect second partial radiation from the radioisotope passing through the second energy-level window as a second partial-radiation detecting signal;
    means for forming a first partial-radiation distribution image from the first partial-radiation detecting signal, and a second partial-radiation distribution image from the second partial-radiation detecting signal;
    means for inferring a scattering radiation component image based on the first and second partial-radiation distribution images; and,
    means for correcting the first partial-radiation distribution image by removing the scattering radiation component image therefrom, whereby the entire radiation detecting signal free from the scattering radiation component is obtained.

35. A scintillation camera apparatus as claimed in claim 34, wherein said radiation emitted from the radioisotope is a gamma ray.

36. A scintillation camera apparatus as claimed in claim 34, wherein said first energy-level window is selected to be approximately 20 to 26% of said specific energy level of said single photopeak, and said second energy-level window is selected to be approximately 2 to 6 keV.

37. A method used for a scintillation camera apparatus as claimed in claim 36, wherein a shape of said scattering radiation component image is analogized as a triangle.

38. A scintillation camera apparatus as claimed in claim 34, wherein first and second memory units are employed; and said window setting means further includes a relevant window discriminating circuit for checking an energy component of one of said first and second partial-radiation detecting signals so as to determine that said first and second partial-radiation distribution images are to be stored in said first and second memory units.

* * * * *